R. T. NEWTON.
VEHICLE.
APPLICATION FILED MAY 18, 1914.
1,382,533.
Patented June 21, 1921.
2 SHEETS—SHEET 2.
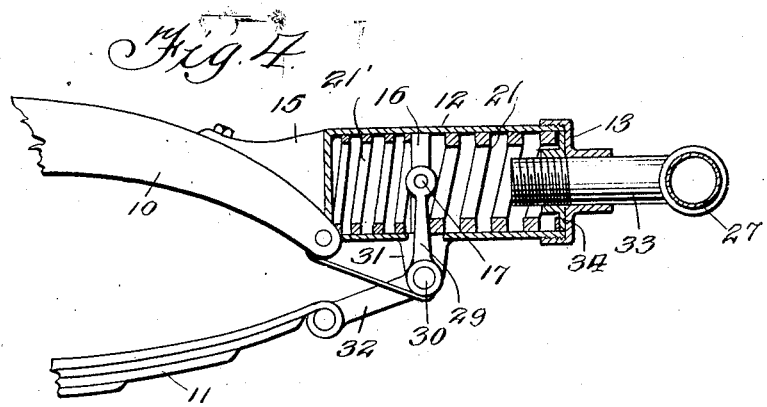
Fig. 4.
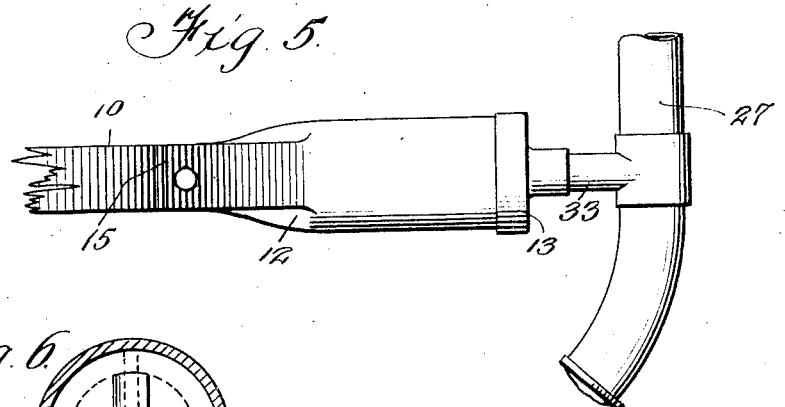
Fig. 5.
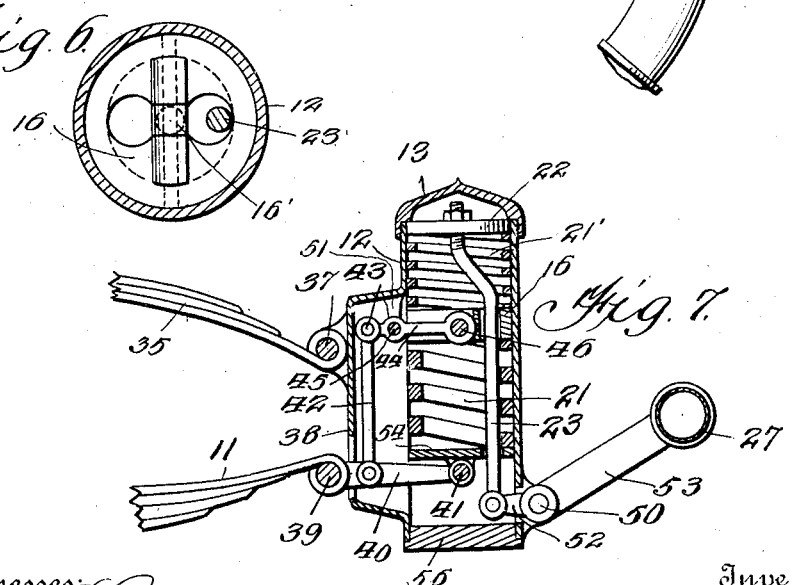
Fig. 6.
Fig. 7.
Witnesses
Inventor
Richard T. Newton,
By his Attorney

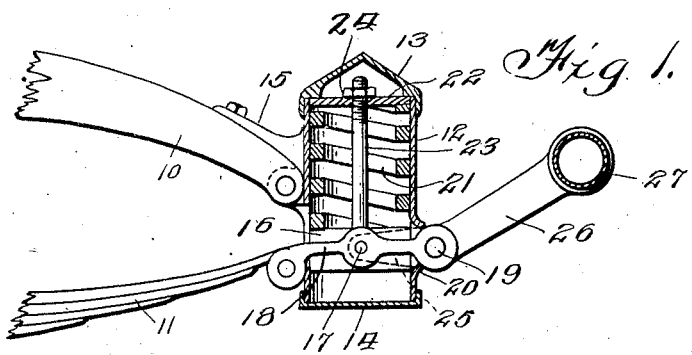
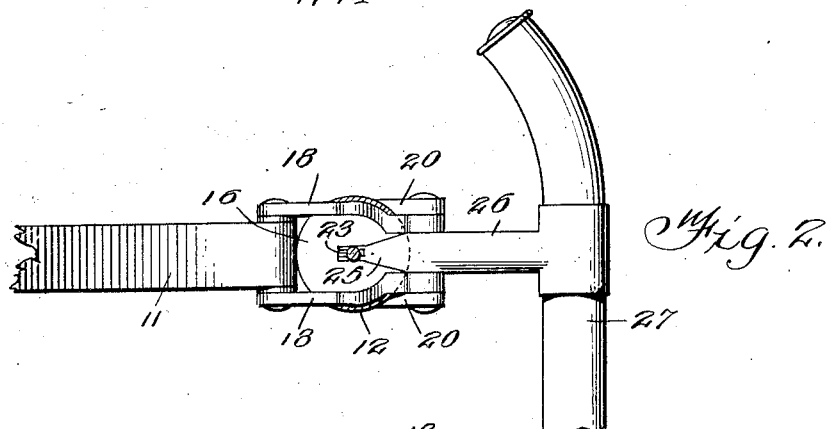
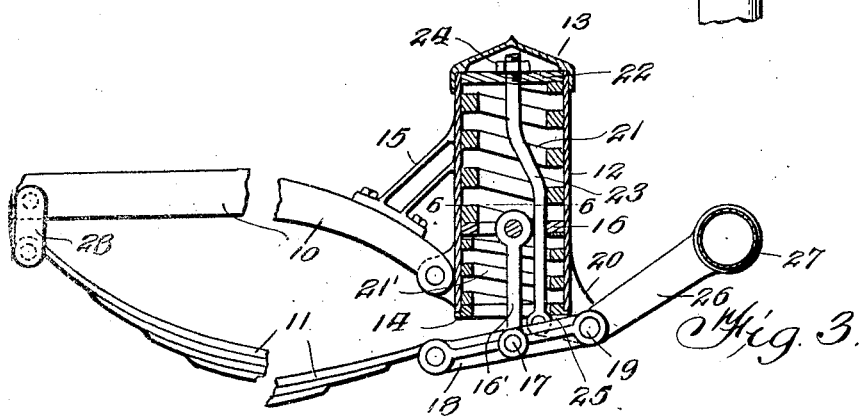

UNITED STATES PATENT OFFICE.

RICHARD T. NEWTON, OF NUTLEY, NEW JERSEY.

VEHICLE.

1,382,533.　　　　Specification of Letters Patent.　　Patented June 21, 1921.

Application filed May 18, 1914. Serial No. 839,471.

*To all whom it may concern:*

Be it known that I, RICHARD T. NEWTON, a citizen of the United States, and resident of Nutley, in the county of Essex and State of New Jersey, have invented certain new and useful Improvements in Vehicles, of which the following is a specification.

This invention relates to vehicles provided with shock neutralizers or supplemental springs, and more especially to shock neutralizers for the front part of a vehicle, to neutralize shocks caused by the front wheels passing over ruts or ridges, and to utilize the elastic elements in such shock neutralizers to also neutralize shocks caused by collision.

The invention consists essentially of a vehicle provided at the front with casings containing coiled springs so arranged as to operate both when a shock is caused by the wheels passing over an obstacle or by the front part of the vehicle striking or colliding against an obstacle, as will now be explained, reference being had to the following specification and claims and the drawings, in which—

Figure 1 shows in section a portion of the frame and leaf spring of the front of a vehicle provided with a shock neutralizer carrying one coiled spring capable of being actuated either by the leaf spring or by the bumper of the vehicle, Fig. 2 shows the same structure seen from below, Fig. 3 is a section showing a modified form in which two coiled springs are used, Fig. 4 is a section showing another construction in which the casing is placed horizontally, Fig. 5 is a plan view of the construction shown in Fig. 4, Fig. 6 is a detail showing the partition 16 of Fig. 3, and Fig. 7 shows a shock neutralizer attached to the upper and lower leaf spring of a double elliptic or three quarter elliptic spring in the front part of a vehicle.

Referring to the drawings, there is shown a part of a vehicle frame 10, a semi-elliptic spring 11, a casing 12, having the cap 13 and the bottom 14, said casing being attached to the vehicle frame 10 by means of the bracket 15. Inside the casing there is a disk 16, which also serves as a partition when more than one spring is used. Through the disk 16 passes a bolt or shaft 17 engaging the forked lever 18 (Fig. 1) or the rod 16' (Fig. 3). The lever 18 is pivotally attached to the leaf spring 11 at one end and has its fulcrum 19 at the other end on a bracket 20, rigidly attached to or forming a part of the casing. Inside the casing is a single coiled spring 21, as shown in Fig. 1, or the two coiled springs 21 and 21' shown in Figs. 3 and 4. Resting against the spring 21 is the adjustable disk 22 through which passes the screw threaded bolt 23 carrying the lock nut 24. In front of the vehicle is the bumper 27 to which is attached one arm 26 of a two armed lever, the other arm 25 being attached to the rod 23.

When a semi-elliptic spring is used, as shown in Figs. 1 and 2, its rear end is attached to the vehicle frame by means of the shackle 28, so as to permit of longitudinal extension. In the construction shown in Figs. 1 and 2, the lever 18 acts directly on the disk 16. In the modified construction shown in Fig. 3 the lever 18 acts upon the disk or partition 16 by means of the rod 16' connecting the lever 18 and the disk 16.

In the modified construction shown in Figs. 4 and 5 one arm 32 of a bell crank lever is pivotally attached to the leaf spring 11 the other arm 29 being attached to the partition 16 by means of the bolt 17. The bell crank lever is fulcrumed at 30 on the bracket 31 attached to the casing.

In the construction shown in Figs. 4 and 5 a rod or tube 33 is pivotally attached to the bumper 27, this tube or rod being screwed into the central enlarged part of the disk 34, the latter actuating the coiled springs 21 and 21'. In the construction shown in Fig. 7 there is an upper leaf spring 35, and a lower leaf spring 11. The upper leaf spring being attached at 37 to a bracket on the casing 12. The lower leaf spring 11 is pivotally attached at 39 to the one armed lever 40, fulcrumed at 41 to a bracket on the lower side of the disk 54, which is supported so as to prevent downward movement. The arm 40 is pivoted to the rod 42 attached at 43 to a lever 44 fulcrumed at 45 to a support 51 attached to an extension 38 of the casing 12. The lever 44 is attached to the disk 16 at 46. Below the disk 16 is a coiled spring 21 and above the disk is a lighter coiled spring 21' resting against the plate 22 attached to the rod 23. Attached to the bumper 27 is the two armed lever 53, fulcrumed at 50 to a bracket attached to the casing 12. The other arm of the lever is attached to the rod 23, which is connected with the disk 22.

In operation the coiled spring 21 is compressed by the upward movement of the disk 16 caused by the movement of the leaf spring 11 as shown in Figs. 1 to 5. In the arrangement shown in Fig. 7 where a double elliptic leafspring is used, the coiled spring 21 is compressed by the disk 16 actuated by the lever 44, the rod 42 and the lever 40, the latter being actuated by the lower leaf spring 11.

When the coiled spring is actuated by the leaf spring 11 this movement has no effect upon the bumper 27 or the mechanism attached thereto. In case of collision the spring 21 when only one coiled spring is used, or the springs 21 and 21′, when two coiled springs are used, take up the shock assisted by the leaf spring 11 through the lever attached thereto. It is thus evident that by means of the addition of a few simple mechanical parts, the same elastic elements that are used to take up the shocks of the wheels, also become available to take up the shock of an eventual collision. As will be seen, there may be used in the casing 12 either two coiled springs or one spring. The former arrangement is usually preferable as by its use shocks are more completely neutralized, but the arrangement with one spring is also practical as it gives good results, especially on lighter forms of vehicles.

It is evident that the same arrangement of the elements of the bumper would be available to actuate a shock neutralizer of a type other than the coiled spring type.

What I claim as new is:

1. In a vehicle, a leaf spring, a casing attached to the front of the vehicle frame, coiled springs in the casing, a partition between the coiled springs, said partition being actuated by the leaf spring, a bumper and means for actuating the coiled springs by the movement of the bumper.

2. In a vehicle, a casing, a coiled spring in the casing, a bumper, means connected with the bumper for actuating the coiled spring, and means connected with a leaf spring for actuating the coiled spring.

3. In a vehicle, a shock neutralizer, a bumper, means connected with the bumper for actuating the shock neutralizer, and means connected with a leaf spring for actuating the shock neutralizer.

4. In a vehicle, a vehicle frame, a leaf spring, a casing, a coiled spring in the casing, a lever attached to the leaf spring and to the casing, a bumper adapted to actuate the coiled spring by the lever, a disk at the end of and resting against the coiled spring, a rod attached to the disk and a two armed lever actuating the rod.

5. In a vehicle, a vehicle frame, a casing attached to the frame a coiled spring in the casing, a lever attached to the leaf spring, and to the casing, means for actuating the coiled spring by the lever, a disk at the end of and resting against the coiled spring, a rod attached to the disk, a two armed lever actuating the rod, and means for adjusting the position of the disk to vary the tension on the coiled spring.

6. In a shock eliminator for vehicles, a substantially vertical spring casing designed to be arranged in extension of and to move with a longitudinal frame member of a chassis, and a lever pivoted to said casing and to the vehicle spring, in combination with a cushioning spring arranged within said casing, and operatively engaged by said lever to cushion the action of the vehicle spring on flexion of the latter.

7. In a shock eliminator for vehicles, a substantially vertical spring casing, designed to be arranged in extension of and to move with a longitudinal frame member of a chassis, and a lever arranged substantially horizontal below said casing and pivoted thereto and to the vehicle spring in combination with a cushioning spring arranged within the casing and operatively engaged by said lever to cushion the action of the vehicle spring on flexion of the latter.

8. In a shock eliminator for vehicles, a vertical spring casing rigid with and substantially in the vertical plane of a chassis frame member, and a lever pivoted to said casing element and arranged to be flexibly connected to the vehicle spring, in combination with a cushioning spring arranged within said casing and operatively engaged by said lever to cushion the action of the vehicle spring on flexion of the latter.

9. In a shock eliminator for vehicles, a substantially vertical spring casing designed to be arranged above and to move with a chassis frame member, and a lever pivotally secured to the casing element and arranged to be flexibly connected to the vehicle spring in combination with a cushioning spring arranged within said casing and operatively engaged by said lever to cushion the action of the vehicle spring on flexion of the latter.

10. For use with a vehicle having a body part and a supporting spring therefor associated with the running gear, said body part and spring being separable at their ends, a self contained shock neutralizer adapted to be operatively interposed between said ends and comprising a casing having means for removably attaching it to the body part, neutralizer spring means in the casing, a lever pivoted to the casing and to the supporting spring, and means pivoted to the lever and operatively associated with the neutralizer spring means in such manner that relative vertical displacement of the said ends will be yieldingly resisted.

11. In a vehicle, a main supporting spring, a shock neutralizing spring operatively interposed between the main spring and the frame, a bumper, and means for actuating the shock neutralizing spring by the movement of the bumper.

12. In a vehicle, a frame, a main supporting spring, a casing fast with the frame, a shock neutralizing spring arranged in said casing and operatively interposed between the main spring and the frame, a bumper, and means for actuating the shock neutralizing spring by the movement of the bumper.

13. In a construction as specified in claim 12, a shock neutralizing spring of the coil-spring type.

14. In a vehicle, a frame, a main supporting spring, a shock neutralizing spring operatively interposed between the main spring and the frame, a bumper, and means for actuating the shock neutralizing spring by the movement of the bumper, said neutralizing spring being engaged at its opposite ends by the main spring element on the one hand and the bumper element on the other hand.

15. In a vehicle, a vehicle frame, a main supporting spring, a casing attached to the vehicle frame, oppositely acting neutralizing springs arranged within said casing, an abutment arranged between and constantly engaged by the said springs, and a lever pivoted to the main spring and casing and operatively connected to said abutment between the neutralizing springs, together with a pivoted buffer and an operating connection between the latter and one of the neutralizing springs.

16. For use with a vehicle having running gear and a body member supported thereon, said running gear and body being separably united, a self-contained shock neutralizer adapted to be operatively interposed between said body member and running gear, and comprising a casing having means for removably attaching it to one of said parts, neutralizer spring means arranged in the casing, a lever pivoted to the casing and to the other of said members, and means operatively connected to the lever and the neutralizer spring means in such manner that relative vertical displacement of the running gear with relation to the vehicle body will be yieldingly resisted.

17. A shock eliminator adapted to be operatively interposed between the running gear and body of the vehicle, said device comprising a shock eliminator spring housing, means for securing the same to one of said members, a lever pivotally connected to the other of said members and to a lateral extension of the housing, a spring within said housing and an operative connection between said lever and spring to freely resist relative vertical displacement of said running gear and vehicle body.

Signed at New York, in the county of New York and State of New York, this 13th day of May, A. D. 1914.

RICHARD T. NEWTON.

Witnesses:
C. A. O. ROSELL,
E. C. DUFF.